(12) United States Patent
Kolozs et al.

(10) Patent No.: US 8,317,025 B1
(45) Date of Patent: Nov. 27, 2012

(54) SELF-ADJUSTING WEDGE BUMPER

(75) Inventors: Robert T. Kolozs, San Diego, CA (US);
Josh S. Moore, San Diego, CA (US)

(73) Assignee: San Diego Composites, Inc., San Diego, CA (US)

( * ) Notice: Subject to any disclaimer, the term of this patent is extended or adjusted under 35 U.S.C. 154(b) by 1309 days.

(21) Appl. No.: 12/072,766

(22) Filed: Feb. 28, 2008

Related U.S. Application Data

(60) Provisional application No. 60/904,248, filed on Mar. 1, 2007.

(51) Int. Cl.
*B65D 81/02* (2006.01)
(52) U.S. Cl. ........... 206/521; 89/1.816
(58) Field of Classification Search ............ 206/592, 206/583, 521; 220/919, 920; 89/1.816; 42/136
See application file for complete search history.

(56) References Cited

U.S. PATENT DOCUMENTS

| | | | | |
|---|---|---|---|---|
| 1,820,729 A * | 8/1931 | Chalmers | ............ | 410/122 |
| 2,933,183 A * | 4/1960 | Koelsch | ............ | 206/335 |
| 2,965,371 A * | 12/1960 | Gulardo | ............ | 267/178 |
| 3,171,632 A * | 3/1965 | Jines | ............ | 254/104 |
| 3,700,097 A * | 10/1972 | Thomas | ............ | 206/583 |
| 3,735,952 A | 5/1973 | Platus | | |
| 3,788,498 A * | 1/1974 | Slusher | ............ | 206/591 |
| 3,823,903 A | 7/1974 | Kendall | | |
| 3,924,511 A | 12/1975 | Kendall | | |
| 3,985,242 A * | 10/1976 | Schlaeger | ............ | 410/121 |
| 4,406,211 A | 9/1983 | Andersen | | |
| 4,981,215 A * | 1/1991 | Ilic | ............ | 206/521 |
| 5,743,689 A * | 4/1998 | Schlaeger | ............ | 410/30 |
| 5,803,213 A | 9/1998 | Davis | | |
| 5,918,865 A | 7/1999 | Osterberg | | |
| 5,947,240 A | 9/1999 | Davis | | |
| 6,413,074 B1 * | 7/2002 | Hays | ............ | 425/398 |
| 6,705,812 B1 * | 3/2004 | Benedict et al. | ............ | 410/153 |
| 2006/0022180 A1 * | 2/2006 | Selness | ............ | 254/104 |

* cited by examiner

*Primary Examiner* — Jacob K Ackun
*Assistant Examiner* — Jenine Pagan
(74) *Attorney, Agent, or Firm* — Virginia P. Shogren

(57) ABSTRACT

A self-adjusting bumper comprising slidably adjustable upper and lower tapered nylon wedges for eliminating rattle space between objects and their containers. A tapered lower wedge comprises a dovetail guide rail and opposing guide pin rails; a tapered upper wedge comprises a corresponding dovetail guide path and opposing slots shaped for insertion and slidable adjustment of the guide pin rails. Opposing helical extension springs secured to the sides of the upper and lower wedges minimize friction forces between the wedges as they slidably move relative to one another. External surfaces of the wedges may be contoured to accommodate the shape of the object and/or its container.

21 Claims, 4 Drawing Sheets

SELF-ADJUSTING WEDGE BUMPER

CROSS REFERENCE TO RELATED APPLICATION

This application claims priority under 35 USC 119(e) of Provisional Patent Application Ser. No. 60/904,248 filed Mar. 1, 2007, entitled "Self-Adjusting Wedge Bumper System," which is hereby incorporated by reference in its entirety.

GOVERNMENT RIGHTS CLAUSE

The U.S. Government has a paid-up license in this invention and the right in limited circumstances to require the patent owner to license others on reasonable terms as provided for by the terms of SPARTA Subcontract No. 05-1015 funded by the Raytheon Company and the Army NLOS-LS Project.

FIELD OF THE INVENTION

This invention relates generally to shock and vibration isolation systems to minimize rattle space, and more particularly to a self-adjusting wedge bumper apparatus and system for transport, storage, and/or operation/removal of objects within containers, including without limitation, missiles transported, stored and operated from the same container.

BACKGROUND OF THE INVENTION

Missiles are often stored, transported and launched from the same cylindrical container. Over the course of inserting the missile into its launch container, transporting the container, storing the container, and launching from the container, the interface between the outside surface of the missile and the internal surface of the container experiences a variety of friction events. For example, the missile will experience rattling and shaking during transport from its production point to a silo. The missile and its container also experience environmental changes over time while the missile is in storage. In addition, the missile and container will experience extreme environmental changes (primarily extreme heat) upon missile egress.

The interface mechanism between the external surface of the missile, on the one hand, and the inside walls of the container, on the other hand, significantly impacts the performance and accuracy of the missile on egress. Consequently, the interface mechanism has the potential for being the critical design load condition for the missile and needs to accommodate various types of movement and temperature changes over the course of time. The interface design is based on requirements for manufacturing tolerances and changes in shape due to environments and/or missile motor operation. For example, over the life of the missile, a missile composite motor case may absorb moisture resulting in swelling of the motor case skin. As another example, at ignition, the high motor combustion pressure will cause the case to grow radially.

The interface design must be secure enough to ensure little or no rattling or shaking of the missile inside the container; must be capable of automatic adjustment to environmental changes, such as swelling of the motor case skin; and, at the same time, must be of sufficiently low friction such that the missile is unaffected by the interface during egress.

In the past, elastomeric pads were used to fill the annular rattle space between the missile and its container/launch tube. The pads, upon compression, would exert a force on the missile to return it to the central position. Currently, various forms and shapes of shims are still used as inserts between the missile and the container. However, the shims are not capable of adjustment to accommodate changes in the radius of the container, and they are limited in their ability to counteract the movement of the container that is in opposite force to the stationary missile contained within. In addition, if the shims are wedged in tightly in order to keep the missile from moving, the friction forces between the shims, the missile, and the container can adversely affect the missile performance due to friction forces upon egress.

Various forms of shims have been developed, yet they do not adequately address the dual requirements for reducing friction and minimizing vibration and movement. For example, U.S. Pat. No. 4,406,211 to Andersen discloses a shock absorbing system for missile containers comprising a plurality of shock pads and struts circumferentially and continuously adhesively bonded to the inside surface of the missile launcher. The continuous ring of pads and struts counteract lateral missile movement, but are not self-adjusting and are in almost continual circumferential contact with the missile thereby causing friction upon egress.

Accordingly, there is a need in the art for a shock absorbing apparatus with minimal interface between the missile and the container, that supports the missile circumferentially while minimizing rattle space, and which minimizes the static and dynamic friction forces at the same interface.

THE INVENTION

Summary of the Invention

The Self-Adjusting Wedge Bumper is a spring loaded self-adjusting apparatus comprising slidably adjustable upper and lower tapered wedges. The apparatus provides minimal interface between an object and its container, is customizable to support and minimize rattle space between a variety of different-shaped objects and their containers, and minimizes the static and dynamic friction force upon removal of the object.

The bumper comprises a generally rectangular-shaped upper wedge having opposing top and bottom faces and opposing sides; a generally rectangular-shaped lower wedge having opposing top and bottom faces and opposing sides; the top face of the lower wedge having at least one guide rail coupled thereto; the bottom face of the upper wedge having at least one guide path opening defined therein, said guide path being shaped for insertion and slidable adjustment of the at least one guide rail; and opposing springs attachable to opposing pins coupled to the sides of the upper and lower wedges.

The lower wedge comprises a generally dovetail-shaped integral guide rail; the upper wedge comprises a generally dovetail-shaped guide path into which the guide rail is slidably mounted. In the preferred embodiment, the guide rail further comprises at least one internal guide pin extending from the top face of the lower wedge and the guide path comprises at least one corresponding slot defined in the bottom face of the upper wedge shaped for insertion and slidable adjustment of the guide pin. The guide pins and corresponding slotted guide paths permit movement of the wedges relative to each other until the internal pins contact the slot ends, thus providing a defined, maximum range of movement for the wedges.

The upper and lower wedges are tapered. When slidably mounted together and overlapping, the upper and lower wedges form a generally rectangular box-shaped bumper. Opposing extension springs, each attached by machine hook to the sides of the upper and lower wedges aid in overcoming the friction to move the upper and lower wedges relative to one another.

As the wedges slidably adjust apart or together, depending on the external force being applied, the bumper self-adjusts to consistently fill the space between the object retained and the container wall.

In the preferred embodiment, the upper wedge further comprises an eye hook for use in pulling the upper wedge apart from the lower wedge from a distance (e.g., by use of a lanyard) so as to narrow the bumper during installation of an object into its container. In the preferred embodiment, the bottom face of the lower wedge further comprises at least one connecting feature to orient the bumper relative to the missile or other object being loaded inside the container.

The top and bottom faces of the upper and/or lower wedges are shaped to conform to a portion of the external surface of the object being retained, on the one hand; and/or a portion of the internal surface of the container, on the other hand. In the preferred embodiment, the bottom face of the lower wedge is flat and is securely attached to the container wall; alternately, the lower wedge may be secured through shim-like pressure between the object and the container. Likewise, in the preferred embodiment, the top face of the upper wedge is contoured to the rounded surface of a missile and is not securely attached to the missile, but alternately, may be secured to the object. Multiple planes of a plurality of bumpers may be positioned along the length of the container to accommodate different sized and shaped objects.

The overlapped tapered wedges form an interface angle. The dimensions of the tapered wedges, and the corresponding interface angle, may be customized to fill the available space between the object being retained and the inside wall(s) of the container. The friction force between the two wedges is dependent on the interface angle, the bumper material utilized, and the extension spring force applied to the sides of the wedges. The friction force between the two wedges should not inhibit relative sliding movement of the wedges. The wedges are made of low friction materials, such as Nylon 6,6.

In an alternate embodiment, opposed dowel pins mounted to the upper surface of the lower wedge and externally to the upper wedge prevent the upper wedge from being dislocated from the lower wedge.

The wedge bumpers may be adapted to any application where it is desirable to minimize rattle space between an object and its container. Such applications include, without limitation, land or air transport of fragile or breakable objects such as mirrors, glass objects, telescopes, satellites, electronic equipment, and any equipment or object being launched into space either independently (i.e., through missile/rocket launch) or as part of a larger object being launched (e.g., equipment on a shuttle). The bumpers also may be adapted to situations in which it is desirable to minimize the friction forces that would otherwise inhibit objects from being placed inside of, or removed from, their container.

The wedge bumpers have the desirable quality of automatically adapting to changes in the rattle space between the object and its container that might result from changes in the radius of one or both of the elements. Such automatic adaptation would be highly beneficial to missile launch tubes used on aircraft, helicopters, ships and tanks. In addition, electronics boards that slide into guide paths would also benefit from a wedge bumper system to accommodate variations in the guide path and plate dimensions, provide low assembly and disassembly forces, but still provide an intimate interface for heat transfer from the board to a heat sink.

BRIEF DESCRIPTION OF THE DRAWINGS

The invention is described in more detail with reference to the attached drawings, in which.

DETAILED DESCRIPTION OF THE ILLUSTRATIVE EMBODIMENT

The following detailed description illustrates the invention by way of example, not by way of limitation of the scope, equivalents or principles of the invention. The nature, objectives and advantages of the invention will become more apparent to those skilled in the art after considering the following detailed description in connection with the accompanying drawings.

Self-Adjusting Wedge Bumper

Figure 1A:
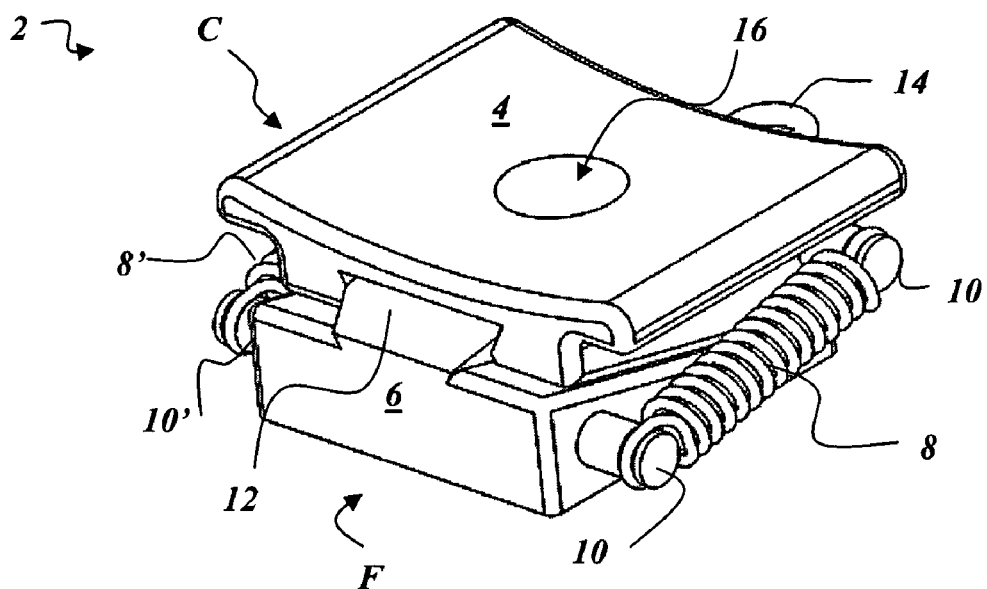
FIGS. 1A and 1B are perspective views of the self-adjusting wedge bumper showing the bumper in a fully closed position with upper and lower wedges overlapped.
Figure 1B:
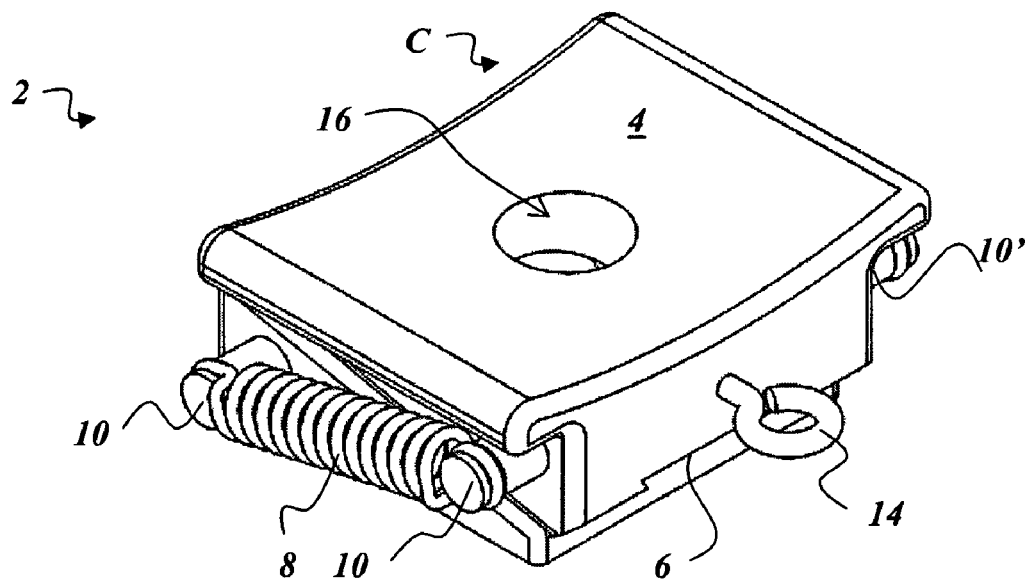

FIGS. 1A and 1B show perspective views of the wedge bumper 2 comprising a generally rectangular-shaped tapered upper wedge 4 overlapping a generally rectangular-shaped tapered lower wedge 6. The lower wedge 6 has a primary, dovetail-shaped guide rail 12 coupled thereto. Opposing springs 8, 8' are mounted to opposing machine hook pins 10, 10' coupled to the sides of the upper and lower wedges 4, 6. As shown in reference to FIGS. 5 and 6, the preferred embodiment comprises secondary internal guide pin rails 24, 24' extending from the top face of the lower wedge 6 and corresponding guide paths of opposing slots 22, 22' shaped for insertion and slidable adjustment of the pins therein.

As shown in FIGS. 1A and 1B, the upper wedge 4 is curved "C" for maximum contact with a curved object (not shown). Upper wedge 4 further comprises an optional central hole 16 defined therein for use in attachment to an object (not shown) being retained by the bumper system 2. Hole 16 is optional; alternately, the upper wedge 4 may comprise pins, brackets, or a combination thereof as suitable or desired for retaining the object against the bumper 2. In the preferred embodiment of this application, the external surface of the upper wedge 4 is smooth because the object being retained (a missile) is stored for launch and the bumper 2 cannot interfere with egress of the missile from the launch container. In other applications, however, it may be desirable to secure the upper wedge 4 to the object.

Referring to FIGS. 1A and 1B, the bottom face of the lower wedge 6 is flat "F" for maximum contact with a flat-shaped container or flat internal sleeve of a container. Again, in the preferred embodiment of this application, the bottom face of the lower wedge 6 is generally flat because that portion of the internal sleeve of the exemplary container for storage of a missile (shown in FIG. 9) is flat. In other applications, however, it may be desirable for the bottom face of the lower wedge 6 to be curved or otherwise shaped for conformity with the shape of the internal portion of the container in contact with the object.

Low-friction materials are used in wedge construction, such as Nylon 6,6. Nylon 6,6 is a semi crystalline polyamide commonly used in fiber applications and in bearings and gears due to its abrasion resistance and self-lubricating properties. However, the wedges 4, 6 may be constructed of any suitable low-friction material, or combination of materials. The top and bottom faces of the wedges 4, 6 may be of a different material than the interface between the wedges 4, 6. The surface of internal guide rail 12 and/or guide path 20 (shown in FIG. 5) may be of different material(s) and exhibit different friction forces than other parts of the wedges 4, 6.

Figure 2:
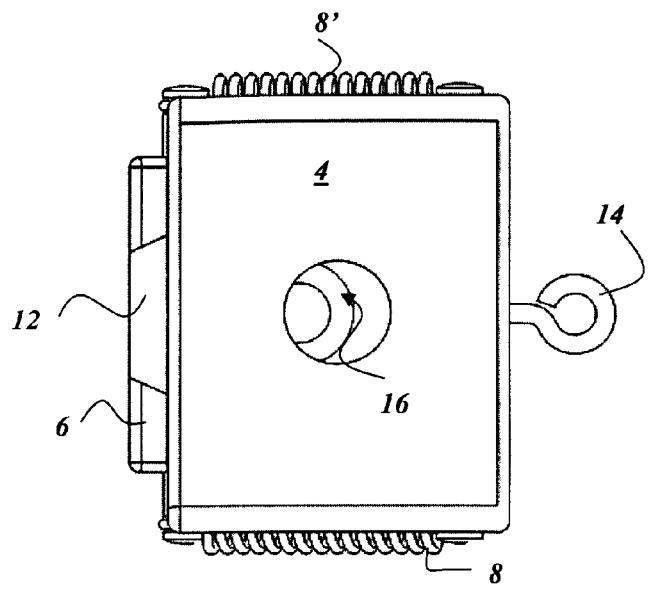
FIG. 2 is a top plan view of the bumper as shown in FIG. 1.

FIG. 2 shows a top plan view of the wedge bumper 2. As shown in FIG. 2, the bumper comprises opposing helical extension springs 8, 8'. The helical spring 8, 8' design is critical to the bumper's 2 performance. The spring size, i.e., major diameter, is constrained by the size of the wedges 4, 6, but is required to have sufficient travel without overstressing and must have the appropriate spring rate to encourage the upper and lower wedges 4, 6 to adjust to minimize rattle space, but not be so large as to inhibit this same motion.

Figure 3:
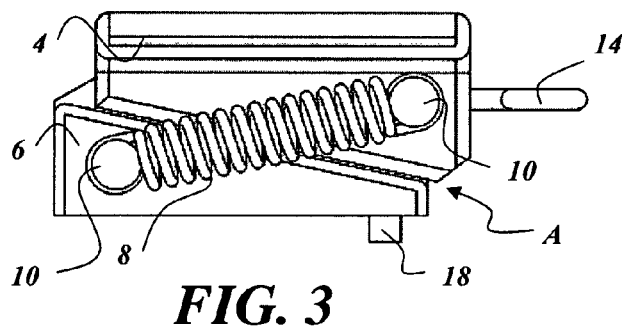
FIG. 3 is a side plan view of the bumper as shown in FIG. 1.

FIG. 3 shows a side plan view of the bumper 2. As shown in FIG. 3, the tapered wedges 4, 6 when mounted against each other form wedge angle "A". Helical spring 8 is shown attached at a first end to the wide end of upper wedge 4, and at a second end to the wide end of lower wedge 6. As the upper and lower wedges 4, 6 slide relative to one another due to movement or other forces applied to one or both of the wedges 4, 6, shown by arrow "SL", the thickness of the bumper 2 automatically increases ("I") or decreases ("D") accordingly. As a result, the bumper 2 is capable of automatic self-adjustment to increase or decrease the space between an object and its container as external forces are applied and/or in response to changes in the radius of the container or object.

Figure 4:
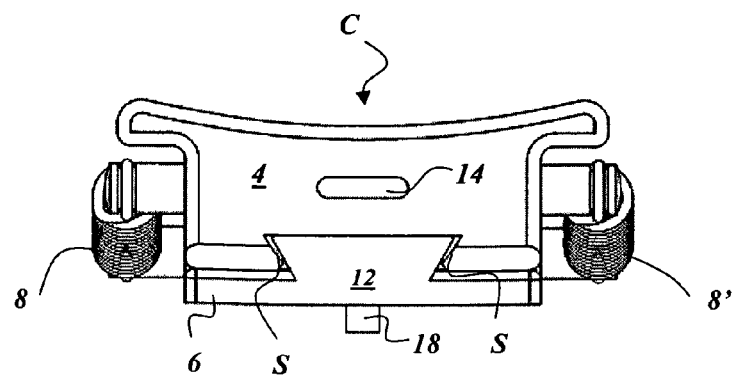
FIG. 4 if a rear plan view of the bumper as shown in FIG. 1.

FIG. 4 shows a rear end view of the bumper 2. Guide rail 12 is integral to the lower wedge 6 and keeps the upper and lower wedges 4, 6 aligned as they slidably move relative to one other. Space "S" between the guide rail 12 and upper wedge 4 allows for movement between upper and lower wedges 4, 6 relative to one another.

Referring to FIGS. 3 and 4, the dovetail guide rail 12 when slidably inserted inside the upper wedge 4 as shown in FIG. 4, retains the two wedges 4, 6 in alignment while allowing relative motion in the axial direction indicated by "SL" in FIG. 3. The top face of wedge 4 comprises the interface to the object being retained, such as a missile, and is curved "C" in FIG. 4 to conform to a missile radius of curvature.

Figure 5:
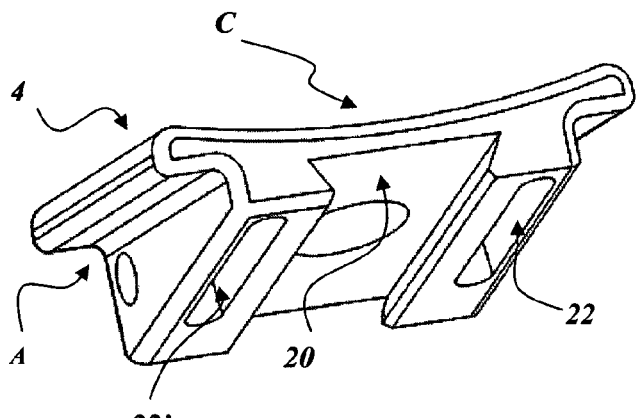
FIG. 5 is a perspective view of the bottom face of the upper wedge showing the guide paths formed in the bottom face of the upper wedge.

FIG. 5 shows a perspective view of the bottom face of the upper wedge 4 with primary guide path opening 20 and secondary guide path openings 22, 22' defined therein. The primary guide path 20 is dovetail in shape for interfacing with the dovetail-shaped guide rail 12 integral to the lower wedge 6 (shown in FIG. 6).

Figure 6:
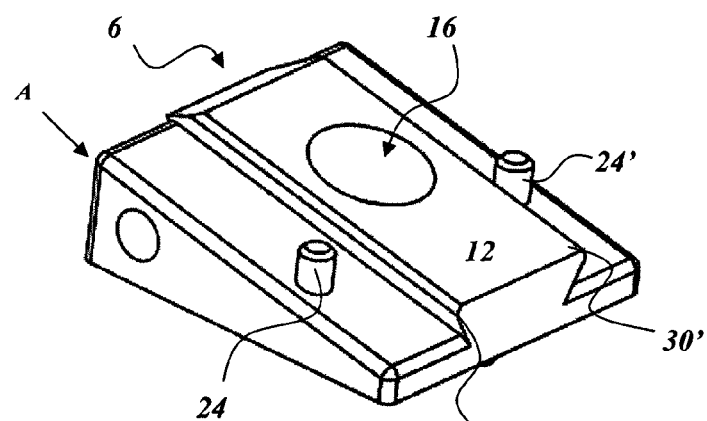
FIG. 6 is a perspective view of the top face of the lower wedge showing the dovetail guide rail and dowel pin guide rails in the lower wedge.

FIG. 6 shows a perspective view of the lower wedge 6 with primary guide rail 12 and guide pins 24, 24'. The lower wedge 6 is shaped at angle "A" so as to be tapered. The upper wedge 4 is shaped at the same angle "A" as shown in FIG. 5. As shown in FIG. 6, the opposing guide pins 24, 24' are positioned on the top face of the lower wedge 6 with corresponding slots 22, 22' formed in the upper wedge 4 (shown in FIG. 5) to allow movement of the wedges relative to each other until the internal dowels contact the slot ends. The guide pins 24, 24' and corresponding guide paths 22, 22' prevent the wedges 4, 6 from dislocating and allow for a defined, maximum range of movement in the sliding direction as shown by "SL" in FIG. 3.

Referring to FIG. 6, the guide rail 12 has shaved edges 30, 30' to decrease friction forces between the sliding guide rail 12 and guide path 20 of the upper wedge 4 (shown in FIG. 5). The tolerances on the interfaces between the upper and lower wedges 4, 6 must be sufficient to keep the wedges 4, 6 from becoming misaligned, thus adding to the friction forces. The guide rail 12 and guide path 20 may be of any suitable design that allows for slidable movement of the guide rail 12 within guide path 20 without undue friction.

Figure 7:
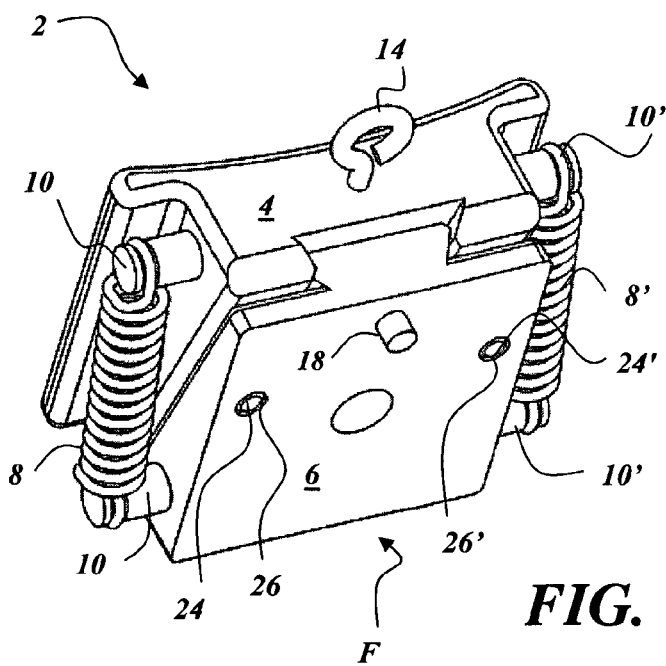
FIG. 7 is a perspective view of the bottom face of the bumper showing opposing holes for insertion of the dowel pin guide rails.

FIG. 7 shows a perspective view of the bottom face of the bumper 2 showing opposing holes 26, 26' for insertion of the guide pins 24, 24'. The holes 26, 26' are utilized during mounting of the bumper 2. The method of mounting at least one bumper 2 comprises the steps of: 1) slidably inserting the dovetail guide rail 12 of the lower wedge 6 into the dovetail guide path 20 of the upper wedge 4 to form a generally rectangular-box shaped bumper; 2) inserting pin guides 24, 24' through the respective holes 26, 26' defined in the lower wedge 6 until the base of the pin guides 24, 24' are flush with the bottom face of the lower wedge 6 and the upper end of the pin guides 24, 24' are inside their respective secondary guide paths 22, 22'; 3) attaching opposing helical extension springs 8, 8' via machine hooks 10, 10' secured in holes in the sides of the upper 4 and lower wedges 6; inserting the connector pin 18 into the container wall (not shown); 4) inserting a pulling mechanism, such as a lanyard (not shown), through the eye-hook 14 in the upper wedge 4; 5) simultaneously pulling the upper wedge 4 apart from the lower wedge 6 (via the lanyard attached to the eye hook 14) to decrease the thickness of the bumper 2 while inserting the object to be stored/transported into the container; 6) releasing the upper wedge 4 by releasing the lanyard to allow the upper wedge 4 to self-adjust over the lower wedge 6 until the rattle space between the object and the container is filled.

As shown in FIG. 7, the bottom face of lower wedge 6 that interfaces with the container is flat ("F") to accommodate attachment to a flat surface. Alternately, the bottom face of the lower wedge 6 may be curved or of any desired shape to conform to the internal surface of the container.

Referring to FIG. 7, in the preferred embodiment, the lower wedge 6 further comprises at least one connecting feature 18 compatible with a container. The connecting feature 18 shown in FIG. 7 is an integral plastic pin (either injection molded or machined into the lower wedge) used to assist with proper orientation of the wedge bumper when assembled. The pin 18 assists in clocking of the wedge bumper to ensure the correct direction of the bumper relative to a missile.

Figure 8:
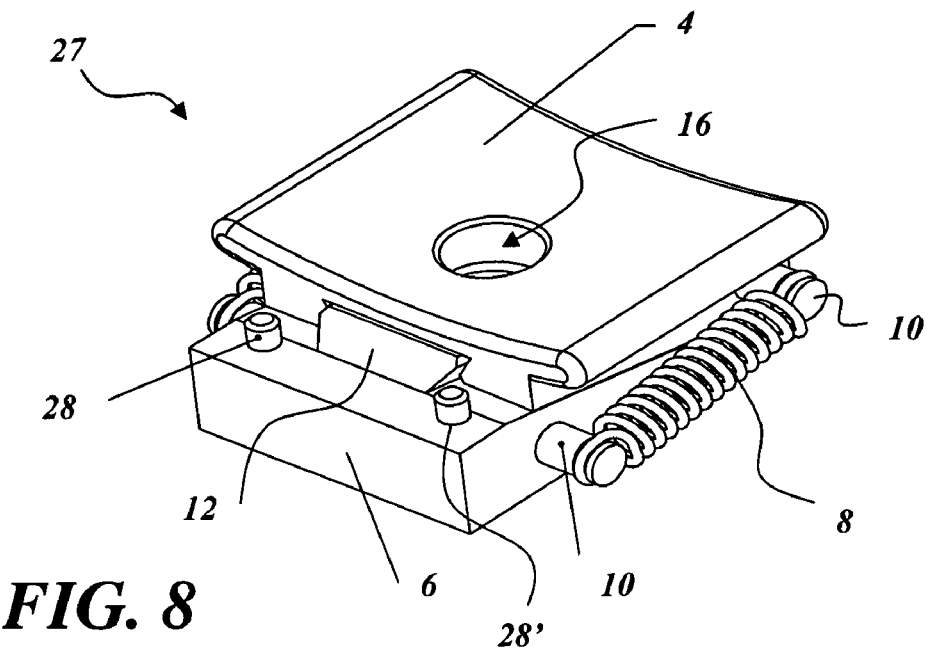
FIG. 8 is a perspective view of an alternate embodiment of the self-adjusting wedge bumper; and, FIG. 9 is a top plan view of an exemplary bumper system with container having two wedge bumpers installed to an inner sleeve.

FIG. 8 is a perspective view of an alternate embodiment of the self-adjusting wedge bumper 27. In this alternate embodiment, the guide pins 28, 28' are external to the upper wedge 4, and the lower wedge does not have secondary guide paths 22, 22' defined therein. As the upper wedge 4 slides towards the viewer in FIG. 8, the upper wedge 4 would come into contact with the external pins 28, 28' mounted on the thick end of lower wedge 6. Once the upper wedge 4 contacts the dowel pins 28, 28' it is prohibited from sliding further towards the viewer in FIG. 8, thus setting a maximum slide range for the wedges 4, 6 and preventing them from dislocating.

Figure 9:
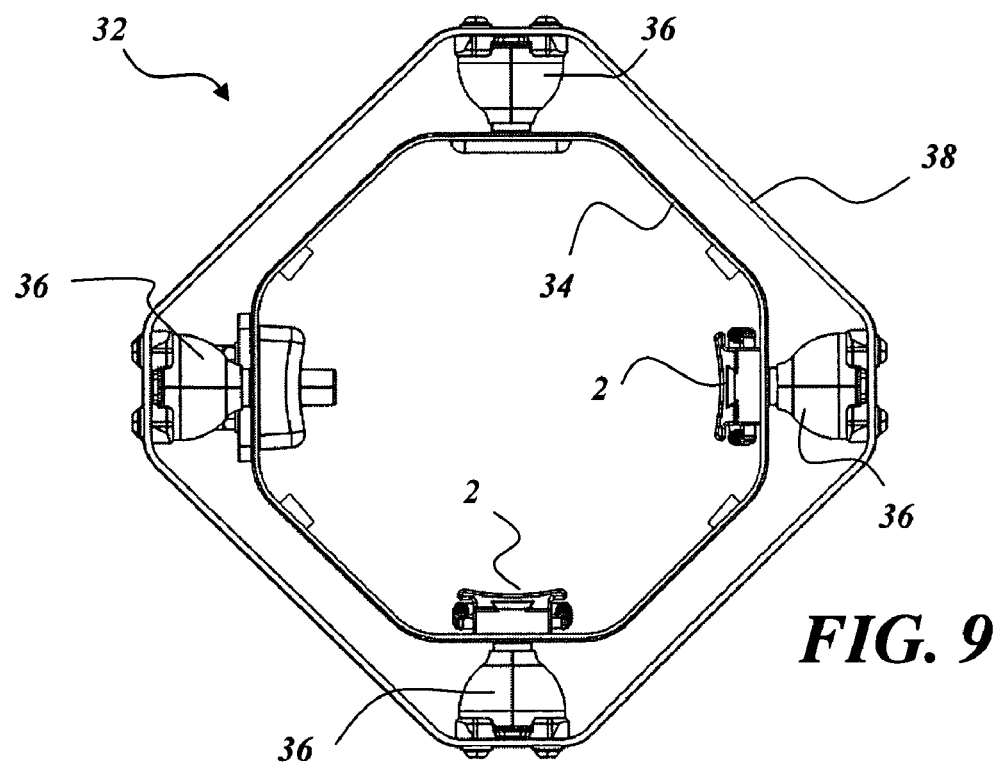

FIG. 9 shows a top plan cross-sectional view of an exemplary missile container system 32. In a missile container system 32, the container serves three functions: storage, transportation, and launch. The exemplary system 32 comprises a container with an external sleeve 38, an internal sleeve 34, four shock isolators 36 and two bumpers 2 (a missile is not shown). The bumpers 2 are installed against the inner sleeve 34. The inner sleeve 34 is, in turn, attached by shock isolators 36 to the outer sleeve 38. A plurality of bumpers 2 may be positioned along the length of the inner sleeve 34 at various desired planes.

Referring to FIG. 9, upon insertion of the missile (not shown) inside container 32, the upper and lower wedges of the bumpers 2 self-adjust and slide relative to one another automatically to continuously fill the space between the missile and inner sleeve. If at any point the missile is reoriented in the container such that a rattle space develops, the upper and lower wedges again self-adjust and slide relative to one another taking up the rattle space.

When the missile motor fires, the motor case grows radially inducing a force at the wedge interface. The wedge angle and the friction are such that the axial forces (parallel to the missile axis) are sufficient to overcome the friction forces due to the normal force at the interface, thus resulting in relative motion of the upper and lower wedges relieving the friction force. During missile egress, the wedges move relative to one another to accommodate any changes in radial dimensions between the missile and the container, thus keeping the friction forces hindering missile egress to a minimum.

INDUSTRIAL APPLICABILITY

It is clear that the inventive Self-Adjusting Wedge Bumper of this application has wide applicability to the transportation, storage, defense and aerospace industries, namely to provide a simple, reliable and low cost bumper to minimize rattle space between objects and their containers. The apparatus and system have broad applicability to protecting fragile or breakable objects ranging from glass-based objects to electronics boards and to protecting any object being launched into space under extreme rattling and heat conditions.

It should be understood that various modifications within the scope of this invention can be made by one of ordinary skill in the art without departing from the spirit thereof and without undue experimentation. For example, the wedges 4, 6 and/or their external surfaces may be of any suitable shape or design for coming into contact with the object and its container and may be securely attached to one or both the object and container or wedged between the two. As another example, the width of the system may be modified to fill the desired space between the object and the container, thereby affecting the tapered angle of the wedges, and the guide rails and guide paths may be of any suitable number, shape or design that would allow the upper wedge to slidably adjust over the lower wedge and visa-versa. The number of bumpers utilized and their position within the container may be customized to fit any shape object and any shape container including non-symmetrical objects. The bumpers may be attached securely or semi-securely to one or both the object and container, or alternately, used in the fashion of shims. This invention is therefore to be defined as broadly as the prior art will permit, and in view of the specification if need be, including a full range of current and future equivalents thereof.

We claim:

1. A self-adjusting bumper comprising:
   a generally rectangular-shaped upper wedge having opposing top and bottom faces and opposing sides;
   a generally rectangular-shaped lower wedge having opposing top and bottom faces and opposing sides;
   the top face of the lower wedge having at least two guide rails coupled thereto, said guide rails comprising a dovetail shaped primary guide rail and at least one secondary guide pin;
   the bottom face of the upper wedge having at least two guide path openings defined therein, said guide paths being shaped for insertion and slidable adjustment of the corresponding guide rails;
   opposing springs attached to opposing pins coupled to the sides of the upper and lower wedges;
   said lower wedge further comprising at least one connector pin and at least one hole shaped therein for insertion of the at least one guide pin; and,
   said upper wedge further comprising an eye hook.

2. The bumper of claim 1, where the bottom face of the upper wedge and the top face of the lower wedge are generally tapered to form a generally rectangular-box shaped apparatus upon complete insertion of the at least two guide rails into the at least two guide paths.

3. The bumper of claim 1, where the top face of the upper wedge is shaped to conform to a shape of a portion of an external surface of an object.

4. The bumper of claim 1, where the bottom face of the lower wedge is shaped to conform to a shape of a portion of an internal surface of a container.

5. The bumper of claim 1, where one of the guide rails is integral to the lower wedge.

6. The bumper of claim 1, where the dovetail shaped guide rail comprises shaved edges.

7. The bumper of claim 1, further comprising a guide in external to an area of potential overlap between the upper and lower wedges.

8. The bumper of claim 1, wherein at least one of the guide paths is shaped to permit a defined maximum range of movement of the upper and lower wedges relative to each other.

9. The bumper of claim 1, where the connector pin is shaped for insertion into a container wall.

10. The bumper of claim 1, where the bottom face of the lower wedge is planar, and the top face of the upper wedge is curved.

11. A system for reducing rattle space between an object and a container for the object, said object having a defined external surface, said container having a defined internal surface, said system comprising:
    at least one self-adjusting bumper comprising:
    a generally rectangular-shaped upper wedge having opposing top and bottom faces and opposing sides;
    a generally rectangular-shaped lower wedge having opposing top and bottom faces and opposing sides;
    the top face of the lower wedge having at least two guide rails coupled thereto, said guide rails comprising a dovetail shaped primary guide rail and at least one secondary guide pin;
    the bottom face of the upper wedge having at least two guide path opening openings defined therein, said guide paths being shaped for insertion and slidable adjustment of the corresponding guide rails;
    opposing springs attached to opposing pins coupled to the sides of the upper and lower wedges;

said lower wedge further comprising at least one connector pin and at least one hole shaped therein for insertion of the at least one guide pin; and, said upper wedge further comprising an eye hook;

the at least one bumper secured to a portion of the internal surface of the container; and, the object positioned inside the container with a portion of the external surface of said object in contact with the upper wedge of the bumper.

12. The system of claim 11, where the bottom face of the upper wedge and the top face of the lower wedge are generally tapered to form a generally rectangular-box shaped apparatus upon complete insertion of the at least two guide rails into the at least two guide paths.

13. The system of claim 11, where the top face of the upper wedge is shaped to conform to a shape of a portion of the external surface of the object.

14. The system of claim 11, where the bottom face of the lower wedge is shaped to conform to shape of a portion of the internal surface of the container.

15. The system of claim 11, where one of the guide rails is integral to the lower wedge.

16. The system of claim 11, where the dovetail shaped guide rail comprises shaved edges.

17. The system of claim 11, further comprising a guide in external to an area of potential overlap between the upper and lower wedges.

18. The system of claim 11, wherein at least one of the guide paths is shaped to permit a defined maximum range of movement of the upper and lower wedges relative to each other.

19. The system of claim 11, where the connector in is shaped for insertion into a container wall.

20. The system of claim 11, where the bottom face of the lower wedge is planar, and the top face of the upper wedge is curved.

21. A method of mounting at least one self-adjusting bumper for reducing rattle space between an object and a container for the object, said bumper comprising a generally rectangular-shaped upper wedge having opposing top and bottom faces, opposing sides, and an eyehook; a generally rectangular-shaped lower wedge having opposing top and bottom faces and opposing sides; the top face of the lower wedge having at least two guide rails coupled thereto, said guide rails comprising a dovetail shaped primary guide rail and at least one secondary guide pin; the bottom face of the upper wedge having at least two guide path openings defined therein, said guide paths comprising a dovetail shaped primary guide path and at least one secondary guide pin path, said guide paths being shaped for insertion and slidable adjustment of the corresponding guide rails; opposing springs attachable to opposing pins coupled to the sides of the upper and lower wedges; the lower wedge further comprising at least one connector pin and at least one hole shaped therein for insertion of the at least one guide pin, said method comprising the steps of:

slidably inserting the dovetail guide rail of the lower wedge into the dovetail guide path of the upper wedge to form a generally rectangular-box shaped bumper;

inserting the at least one pin guide through the hole defined in the lower wedge until the base of the pin guide is flush with the bottom face of the lower wedge and the upper end of the pin guide is inside its respective secondary guide pin path;

attaching the opposing springs to the opposing pins coupled to the sides of the upper and lower wedges;

inserting the connector pin into an internal surface of the container;

inserting a pulling mechanism through the eyehook in the upper wedge;

simultaneously pulling the upper wedge apart from the lower wedge via the pulling mechanism while inserting the object into the container; and, releasing the upper wedge by releasing the pulling mechanism thereby allowing the upper wedge to self-adjust over the lower wedge until the rattle space between the object and the container is filled.

\* \* \* \* \*